US005205970A

United States Patent [19]

Brun et al.

[11] Patent Number: 5,205,970

[45] Date of Patent: Apr. 27, 1993

[54] METHOD OF INFILTRATION FORMING A SILICON CARBIDE BODY WITH IMPROVED SURFACE FINISH

[75] Inventors: Milivoj K. Brun, Ballston Lake; William A. Morrison, Albany, both of N.Y.

[73] Assignee: General Electric Company, Schenectady, N.Y.

[21] Appl. No.: 863,604

[22] Filed: Apr. 3, 1992

[51] Int. Cl.[5] .............. C04B 35/56

[52] U.S. Cl. .............. 264/60; 264/62; 264/340; 501/88; 501/90

[58] Field of Search .............. 264/60, 62, 340; 501/88, 90

[56] References Cited

U.S. PATENT DOCUMENTS

| | | | |
|---|---|---|---|
| 3,860,443 | 1/1975 | Lachman et al. | 117/106 |
| 4,145,471 | 3/1979 | Kendall et al. | 428/366 |
| 4,238,433 | 12/1980 | Hillig | 264/60 |
| 4,294,788 | 10/1981 | Laskow | 501/92 |
| 4,642,271 | 2/1987 | Rice | 428/698 |
| 4,889,686 | 12/1989 | Singh et al. | 419/13 |
| 4,944,904 | 7/1990 | Singh et al. | 269/60 |
| 4,981,822 | 1/1991 | Singh et al. | 501/95 |
| 5,015,540 | 5/1991 | Borom et al. | 428/698 |
| 5,021,367 | 6/1991 | Singh et al. | 501/88 |
| 5,026,604 | 6/1991 | Thebault | 428/367 |
| 5,043,303 | 8/1991 | Singh et al. | 501/90 |

*Primary Examiner*—James Derrington
*Attorney, Agent, or Firm*—James E. McGinness; James Magee, Jr.

[57] ABSTRACT

A method of infiltration forming silicon carbide bodies having an improved surface finish comprises, infiltrating a porous carbonaceous preform with molten infiltrant to form a silicon carbide body. The body is heated in an inert atmosphere or vacuum to a temperature where the infiltrant is molten while the body is positioned in contact with an infiltrant wicking means. Preferably, the wicking means has infiltrant wicking capillaries at least as large as the infiltrant wicking capillaries in the body. Capillary force draws excess infiltrant on the surface of the body from the surface leaving the reaction formed silicon carbide body with a surface substantially free of excess infiltrant droplets.

3 Claims, 3 Drawing Sheets

METHOD OF INFILTRATION FORMING A SILICON CARBIDE BODY WITH IMPROVED SURFACE FINISH

This invention is related to a method of infiltration forming silicon carbide bodies, and more particularly to a method for improving the surface finish of the bodies.

BACKGROUND OF THE INVENTION

Methods for infiltrating porous carbonaceous preforms with a molten silicon or silicon alloy infiltrant to form silicon carbide bodies are disclosed, for example, in U.S. Pat. Nos. 4,889,686: 4,944,904: 4,981,822: 5,015,540: 5,021,367: and 5,043,303, incorporated herein by reference. Briefly described, the infiltration method comprises forming an assembly of the porous carbonaceous preform and means for contacting the preform with infiltrant, either by placing infiltrant directly on the preform or placing the preform and a deposit of infiltrant on a wicking material such as carbon cloth. The assembly is heated to the infiltration temperature, about 10° to 20° C. above the melting point of the infiltrant for a period of time to provide for infiltration of the infiltrant into the preform. A body having a silicon carbide matrix is formed in situ by the reaction bonding between the carbonaceous preform and infiltrant.

To provide for complete infiltration and filling of porosity in the preform, an excess of infiltrant is supplied to the preform. After infiltration, the excess infiltrant appears as small droplets on the surface of the reaction formed body. The infiltrant droplets can be removed from the surface of the body by diamond grinding. Besides adding an extra processing step, such grinding can reduce the strength or toughness of the body by introducing grinding defects in the surface. It is highly desirable to eliminate the excess infiltrant droplets from the surface of the reaction formed bodies to eliminate the need for post machining operations, and minimize the formation of grinding defects on the surface of the body.

One aspect of this invention is to provide a method of infiltration forming silicon carbide bodies that provides for removal of excess infiltrant from the surface of the body.

Another aspect of this invention is to provide a wicking method for removing excess infiltrant from the surface of infiltration formed silicon carbide bodies.

BRIEF DESCRIPTION OF THE INVENTION

A method of infiltration forming silicon carbide bodies having an improved surface finish comprises, infiltrating a porous carbonaceous preform with a molten infiltrant to form a silicon carbide body. The body is heated in an inert atmosphere or vacuum to a temperature where the infiltrant is molten while the body is positioned in contact with an infiltrant wicking means. Preferably, the wicking means has infiltrant wicking capillaries at least as large as the infiltrant wicking capillaries in the body. Capillary force draws excess infiltrant on the surface of the body from the surface leaving the reaction formed silicon carbide body with a surface substantially free of excess infiltrant droplets.

As used herein, the term "infiltrant" means silicon, or a silicon alloy comprised of a metal having a finite solubility in molten silicon, the metal being present up to the saturation point of the metal in the silicon, and the balance substantially silicon. For example, some of the metals having a finite solubility in molten silicon are boron, molybdenum, tungsten, chromium, titanium, zirconium, hafnium, aluminum, niobium, and tantalum.

DETAILED DESCRIPTION OF THE INVENTION

Figure 1:
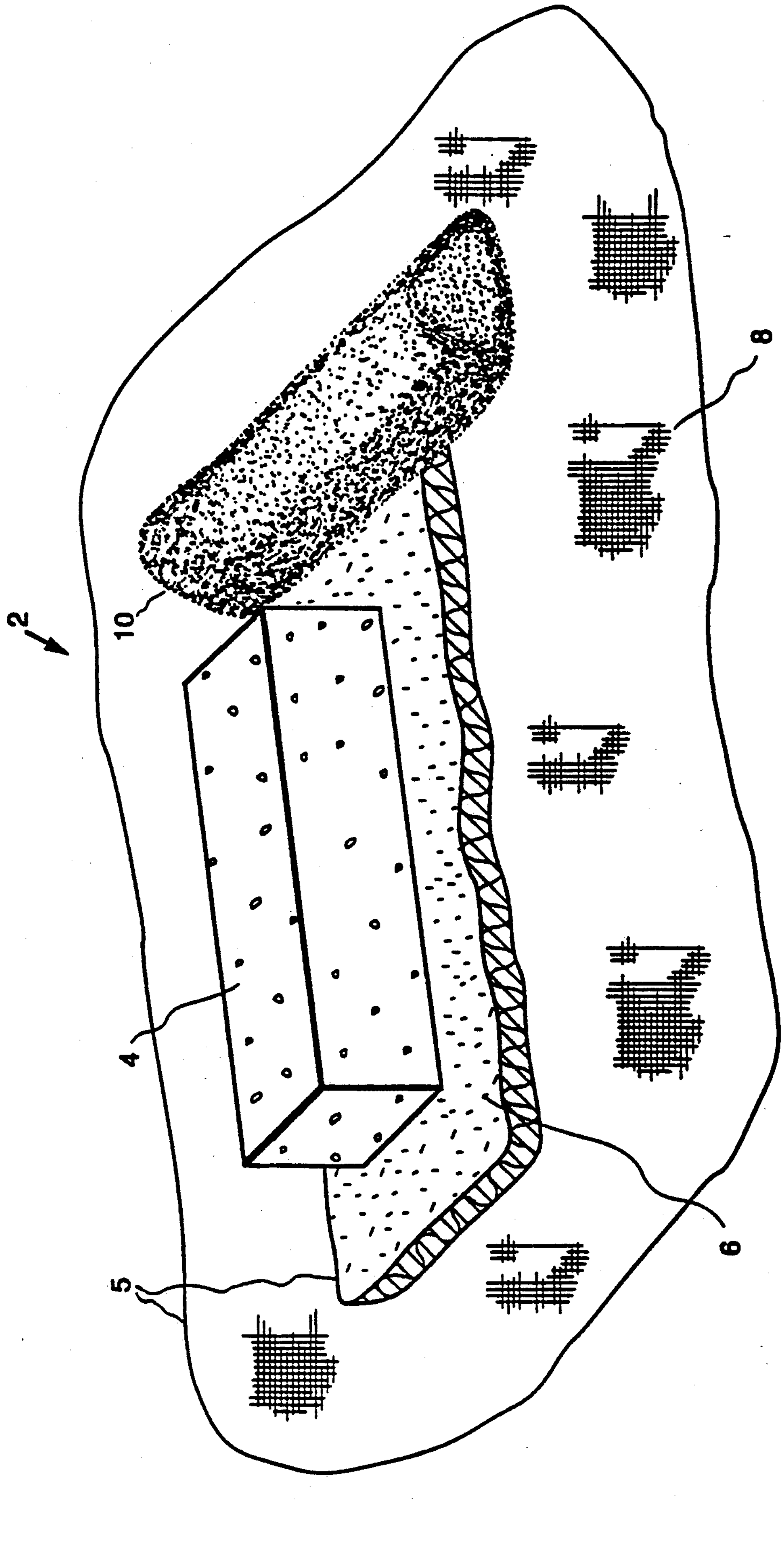
FIG. 1 is perspective view of an assembly comprised of a porous carbonaceous body positioned on a piece of carbon felt, in turn positioned on a carbon fiber cloth.

By the method of this invention porous carbonaceous preforms can be cast or machined to a desired shape, and infiltrated with molten infiltrant to form a reaction bonded silicon carbide matrix body without the need for surface machining to return to the original preform surface and dimensions. To provide complete infiltration and filling of porosity in the reaction formed body, an excess of molten infiltrant is provided to the preform during infiltration. We have found that excess infiltrant on the surface of reaction formed bodies can be removed by a wicking means such as a piece of carbon felt. Excess infiltrant is wicked from the surface of the body into the wicking means by capillary force.

The porous carbonaceous preform is formed from a carbonaceous material at least comprised of carbon, and may include a reactive metal component and a ceramic component. The carbonaceous material can be in the form of a carbon vapor infiltration formed coating, powder particles, or fibers. Preferably, fibers in the carbonaceous material have an aspect ratio of about 5 to 50, and a diameter of about 0.5 to 25 microns. Preferably, powder particles in the carbonaceous material have an average particle size of less than 50 microns, more preferably about 0.5 to 25 microns.

The composition of the carbonaceous material is determinable empirically and depends on the particular silicon carbide body desired, i.e. the particular properties desired in the silicon carbide body. However, the carbonaceous material is at least comprised of an amount of carbon that can react with the infiltrant, and bond the matrix of the body with silicon carbide formed in situ. Carbon can range from about 5% by volume, or from 10% or 20% by volume, to about 100% by volume, of the carbonaceous material. The carbonaceous material as well as any reaction product thereof produced in the infiltration process should not flow to any significant extent and preferably is solid in the infiltration process.

As used herein, the term carbon includes amorphous, single crystal, or polycrystalline carbon, graphite, carbonized plant fibers, lamp black, finely divided coal, charcoal, and carbonized polymer fibers or felt such as rayon, polyacrylonitrile, and polyacetylene.

Carbon powder serves as a source of carbon to react with the infiltrant and form silicon carbide, and as a binder to maintain the shape and integrity of the preform. The carbon powder particles can have a density of about 1.2 to 2.2 grams per milliliter. Preferably, the carbon powder particles are a low density amorphous carbon having a density of about 1.2 to 1.6 grams per milliliter. A suitable carbon powder is a Dylon aqueous graphite powder suspension, Dylon Industries, Inc., Ohio. Other sources for carbon powder are Johnson Matthey, Mass., and Great Lakes Carbon, N.Y. The amount and type of carbonaceous material depends largely on the particular composite desired and is determinable empirically.

Preferably, the carbonaceous material and resulting preform contain some fibrous carbon in the form of chopped fibers or whiskers. The whiskers promote infiltration by wicking molten silicon into the preform and are a source of carbon for reacting with the infiltrant to form silicon carbide. Long whisker lengths are desirable to achieve good wicking, while short whisker lengths result in better packing and less porosity to fill in the preform. The whiskers also provide strength to the preform. Chopped fibers or whiskers can be described by the aspect ratio of the fiber, i.e. fiber length to diameter. The whiskers have a density of about 1.2 to 2.2 grams per milliliter, preferably, about 1.2 to 1.6 grams per milliliter. Low density furnace insulation type WDF carbon felt, available from National Electric Carbon, N. Olmstead, Ohio can be crushed and abraded against a wire mesh screen, for example about 40 mesh, to form suitable whiskers. Low density carbon fiber can be formed by carbonizing naturally occurring cellulose fibers, including cotton, chitosan, and bamboo, and chopped or crushed to form the whiskers.

The carbonaceous material also may include up to about 25 volume percent of a reactive metal which reacts with elemental silicon to form a silicide. Reactive metals include molybdenum, chromium, tantalum, titanium, tungsten and zirconium. The molybdenum or tungsten silicides that form in the preform during infiltration provide a diffusion path for transportation of free silicon to react with carbon, molybdenum, or tungsten, and form high melting temperature silicides.

The carbonaceous material may also include a ceramic material, in an amount up to about 50 percent by volume of the carbonaceous material. The ceramic filler material may or may not react with silicon, and is a ceramic such as a ceramic carbide, a ceramic nitride or a ceramic silicide. The filler can be selected to provide additional control of the swelling, the rate of the exothermic reactions occuring during infiltration, or to reduce density in the composite. A suitable ceramic material is a ceramic carbide such as boron carbide, molybdenum carbide, niobium carbide, silicon carbide and titanium carbide; a ceramic nitride such as aluminum nitride, niobium nitride, and silicon nitride, titanium nitride and zirconium nitride; a ceramic oxide such as alumina, yttria, silica, and mullite; or a ceramic silicide such as chromium silicide, molybdenum silicide, tantalum silicide, titanium silicide, tungsten silicide, and zirconium silicide. The ceramic material can be a powder or fiber, preferably comparable in size to the other carbonaceous materials described above. However, the ceramic material can be continuous fiber lengths, e.g., continuous lengths of reinforcement fibers such as high strength silicon carbide or carbon fibers.

The preform can be formed from the carbonaceous material by known and conventional ceramic powder forming techniques that provide a homogenous distribution of the desired porosity and carbonaceous material in the preform. Suitable methods of forming carbonaceous material into preforms are disclosed for example in the R. P. Messner, Y. M. Chiang, disclosure cited above, and U.S. Pat. Nos. 4,889,686, 4,944,904, 4.981,822, 5,015,540, 5,021,367, and 5,043,303, all incorporated herein by reference. Preform porosity is determined by the packing density of the carbonaceous material used to form the preform. In addition, silicon powder can be used as a porosity component in forming the preform since any silicon in the preform will become molten at the infiltration temperature and become part of the infiltrant.

The preform has an open porosity ranging from about 25% by volume to about 90% by volume of the preform, and the particular amount of such open porosity depends largely on the particular composite desired. Preferably, the preform has an open porosity ranging from about 30% to about 50% by volume to minimize cracking, swelling, or retained porosity in the final infiltrated silicon carbide body. In preforms having less than about 30 volume percent porosity, premature reaction-choking can occur preventing complete infiltration of the preform. A preform having greater than about 50 percent porosity may not have complete infiltration of the pores, resulting in incomplete filling of porosity.

By open porosity of the preform, it is meant herein pores, voids or channels which are open to the surface of the preform thereby making the interior surfaces accessible to the ambient atmosphere or the infiltrant. Preferably, the preform has no closed porosity. By closed porosity it is meant herein closed pores or voids, i.e. pores not open to the surface of the preform and therefore not in contact with the ambient atmosphere. Preferably, the pores in the preform are small, ranging from about 0.1 micron to about 50 microns, and are distributed uniformly through the preform thereby enabling the production of a composite wherein the matrix phase is uniformly distributed through the composite.

For example, the carbonaceous material can be formed into the porous preform by mixing the components in an organic polymer binder such as epoxy resin. The organic based mixture can be formed or shaped into the porous preform by a number of known techniques. For example, the mixture can be cast, extruded, injection molded, die-pressed, isostatically pressed or slip cast to produce the preform of desired size and shape. Preferably, the preform is of the size and shape desired of the silicon carbide body. Generally, there is no significant difference in dimension between the preform and the resulting silicon carbide body. Any lubricants, binders, or similar materials used in shaping the mixture are of the type which decompose on heating at temperatures below the infiltration temperature, preferably below 500° C., without leaving a residue that degrades the infiltration of the preform. It should the understood a suitable binder may leave a porous carbon deposit that does not degrade the infiltration of the preform.

The preform can also be formed from a water based slurry of the carbonaceous material. A suitable water based slurry mixture is formed by mixing the carbonaceous material, e.g., carbon fibers, carbon particles, reactive powder, and ceramic material in an aqueous solution comprised of about 2 to 6 weight percent of a nonionic poly(ethylene oxide) homopolymer ranging in weight average molecular weight from about one-hundred thousand to five million. A suitable ethylene oxide polymer is Polyox WSR-205 or WSR Coagulant, Union Carbide. The ethylene oxide polymer thickens the mixture and maintains the homogeneity in the mixture of carbonaceous material so, for example, the higher density reactive powder does not separate out.

The water based slurry mixture can be poured into a mold to form a shaped preform, or spread with a straight edge to form a sheet or tape preform. The liquid is allowed to evaporate in air, and the polymer is decomposed by heating to 300° C. in air. Additional strength is provided to the preform by infiltrating into the preform a dilute solution of a furfuryl alcohol or tetrahydrofurfuryl alcohol, for example, 931 graphite adhesive binder, Cotronics, N.Y. Alternatively, the furfuryl alcohol or tetrahydrofurfuryl alcohol can be mixed into the slurry prior to casting in amounts up to about 50 weight percent of the solution. The preform is dried in air, heated to 100° C. to crosslink the resin, and heated to 300° C. in air to decompose the resin. A preform with a homogenous distribution of porosity and carbonaceous material is formed.

The preform can be infiltrated by conventional means well known to those skilled in the art. Infiltration provides for penetration of molten infiltrant into the porous preform, and reaction with the carbon and reactive metal in the preform to form a body having a silicon carbide matrix formed in situ. An excess amount of infiltrant is provided during infiltration for complete reaction of the carbonaceous material, reactive metal, and the filling of any remaining porosity with infiltrant in the reaction formed body.

A method of infiltrating the preform is disclosed in U.S. Pat. No. 4,626,516, incorporated herein by reference. Briefly described, an assembly that includes a mold with infiltration holes and a reservoir holding silicon is formed. The preform is placed within the mold and carbon wicks are provided in the infiltrating holes. The wicks are in contact with the preform, and with the infiltrant, and at infiltration temperature the molten silicon migrates along the wicks into the preform.

U.S. Pat. No. 4,737,328, incorporated herein by reference, discloses another infiltration method which comprises contacting the preform with a powder mixture composed of silicon and boron nitride, heating the resulting assembly to a temperature at which the infiltrant is molten, and infiltrating the molten infiltrant into the preform. A porous boron nitride powder remains on the reaction formed body and is easily removed by brushing.

After infiltration, the excess infiltrant is removed from the reaction formed body by heating the body to a temperature where the infiltrant is molten, while the body is positioned in contact with the wicking means. The removal of excess infiltrant can be performed in the same heating operation after infiltration is complete, or in a second method a reheating step is performed after the reaction formed body has been cooled to room temperature. For example, after infiltration has been completed the reaction formed body is maintained at the infiltration temperature and the wicking means is brought into contact with the body. A suitable wicking means is the WDF carbon felt. Other suitable wicking means include porous bodies of infiltrant wettable materials that are solids at the temperature where the infiltrant is molten, such as carbon, silicon carbide, titanium carbide, chromium silicide, molybdenum silicide, zirconium silicide, silicon nitride, aluminum nitride, boron nitride, titanium diboride, zirconium diboride, or aluminum diboride.

Preferably, the wicking means has capillaries that are at least as large or larger than the capillaries remaining in the reaction formed body. In this way, infiltrant in the reaction formed body that is filling porosity will remain in the reaction formed body instead of being drawn into the wicking means and leaving porosity in the reaction formed body. In the second method, the reaction formed body can be cooled to room temperature, placed on the wicking means, and reheated to the temperature where the infiltrant is molten. The assembly is held at the temperature to provide for wicking of the excess infiltrant into the wicking means.

The assembly is heated to the infiltration temperature in an inert atmosphere or partial vacuum. Suitable inert atmospheres include argon, or reducing atmospheres such as hydrogen or carbon monoxide. Atmospheres that react with molten silicon, such as oxygen or nitrogen, are avoided. The remaining atmosphere of the partial vacuum should be inert, such as argon, or reducing such as carbon monoxide. Preferably, the nonoxidizing partial vacuum is provided before heating is initiated. The partial vacuum is at least sufficient to avoid the entrapment of pockets of gas, and minimizes porosity in the infiltration formed body. Generally, such a partial vacuum ranges from about 0.01 torr to about 2 torr, and usually from about 0.01 torr to about 1 torr to remove gas evolving in the preform being infiltrated.

Preferably, the furnace used to heat the assemblies is a carbon furnace, i.e. a furnace fabricated from elemental carbon. Such a furnace acts as an oxygen getter for the atmosphere within the furnace reacting with oxygen to produce CO or $CO_2$ and thereby provides a nonoxidizing atmosphere, i.e. reaction between the residual gas, preform, and infiltrant is minimized. Infiltration cannot be carried out in air because the liquid silicon would oxidize to form a dense silica coating before any significant infusion by silicon occurred. In such instance where a carbon furnace is not used, it is preferable to have an oxygen getter present in the furnace chamber, such as elemental carbon in order to provide a nonoxidizing atmosphere. Alternatively, other nonoxidizing atmospheres inert to the infiltration process can be used at partial vacuums of about $10^{-2}$ torr to 2 torr.

Figure 2:
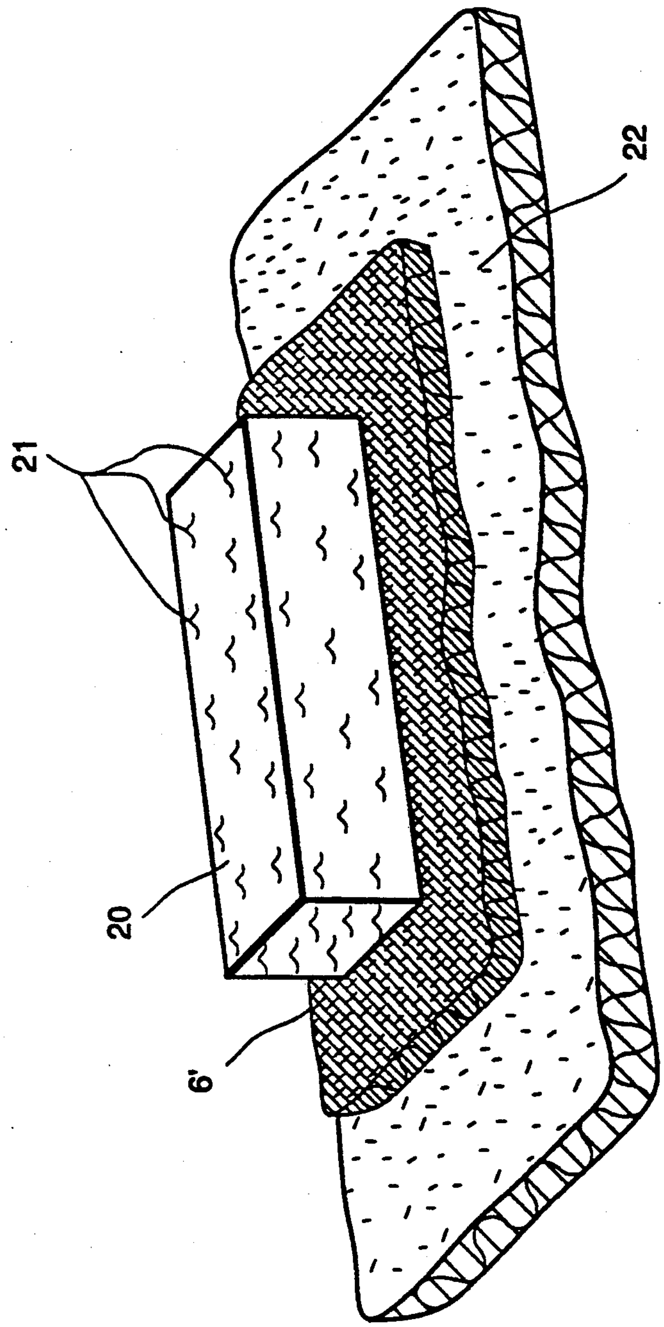
FIG. 2 is a perspective view of a reaction formed silicon carbide body positioned on a silicon carbide felt, in turn positioned on a piece of carbon felt.
Figure 3:
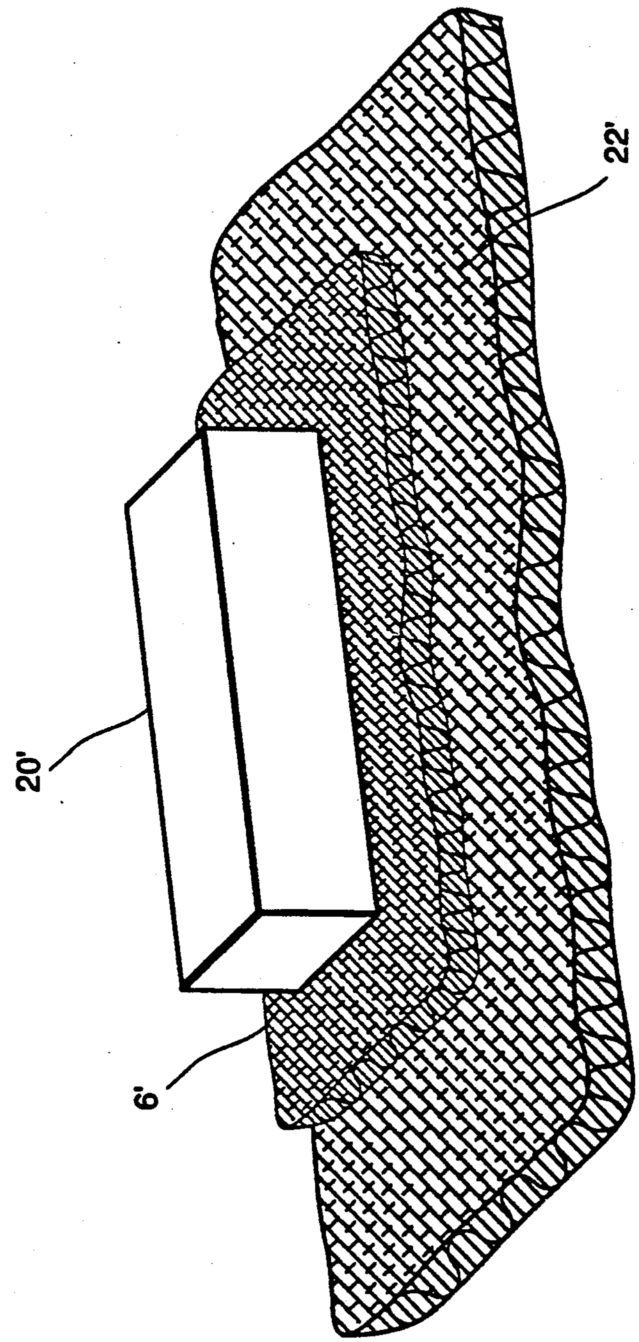
FIG. 3 is a perspective view of the reaction formed silicon carbide body after excess infiltrant has been removed from the surface.

Infiltration to form a reaction bonded silicon carbide body having an improved surface finish is shown by making reference to FIGS. 1–3. An assembly 2 is formed comprised of a porous carbonaceous preform 4 positioned in contact with a wicking means 5, and a deposit 10 of infiltrant formed thereon. The wicking means 5 is comprised of a piece of carbon felt 6, positioned on a carbon fiber cloth 8, for example WCA carbon cloth, National Electric Carbon, Ohio. The carbon felt 6 provides limited migration of the infiltrant, and the carbon cloth 8 is preferred for transporting infiltrant from deposit 10 to porous preform 4. However, carbon cloth 8 is difficult to remove from the reaction formed body, and requires diamond machining to remove the reacted carbon cloth. Preferably, carbon felt 6 is used to wick infiltrant directly into the preform 4.

Infiltrant deposit 10 is sufficient to provide an excess amount of infiltrant for completely infiltrating wicking means 5, and the porous preform 4. The assembly is heated to a temperature where the infiltrant is molten but below the vaporization temperature of the infiltrant, for example about 1410° C. to 1600° C. At the infiltration temperature, the molten infiltrant migrates along the carbon fiber cloth 8 and wicks into the preform through the carbon felt 6. The molten infiltrant reacts with carbon in the cloth 8, felt 6, and preform 4 to form silicon carbide. After infiltration, excess silicon remains as frozen droplets 21, shown in FIG. 2, on the surface of the reaction formed body 20. The reaction formed body 20 is removed from the reacted cloth, for example by breaking the reacted felt away from the reacted cloth.

Referring to FIG. 2, the reaction formed body 20 having excess infiltrant droplets 21 on the surface, and reacted felt 6' bonded thereto is positioned on a piece of carbon felt 22, to form a second assembly. The second assembly is heated to the temperature where the infiltrant is molten, and the infiltrant on the surface of the body 20 and within reacted felt 6' are drawn by capillary force and gravity into the carbon felt 22. The infiltrant reacts with carbon in felt 22 forming silicon carbide felt 22', shown in FIG. 3.

Referring to FIG. 3, the reaction formed silicon carbide body 20' is left with a surface substantially free of the infiltrant droplets. The silicon carbide felt 6' supports the body 20' on a plurality of silicon carbide fibers. The body 20' is readily removed from the felt 6' since excess infiltrant that had bonded the body to the felt has been removed, and the reacted fibers form weak bonds with the body. If any fibers from felt 6' remain on the body 20' after it has been removed from the felt 6', the fibers can be removed by light grinding or diamond polishing.

Additional features and advantages of the method of this invention are shown in the following examples where, unless otherwise stated, the following materials and equipment were used. The carbon fiber was WDF carbon felt about 1.2 g/ml in density obtained from Union Carbide, and abraded against a wire mesh screen to form fibers having an average aspect ratio of about 20:1 and and average fiber diameter of about 7 microns. The epoxy resin binder was Epon 828, Shell Chemical Co., Tex., and the hardener was diethylenetrianine, Eastman Kodak. A Centorr carbon resistance furnace was used to infiltrate the porous carbonaceous preform, and was contained in a vacuum system.

EXAMPLE 1

A mixture of 80 grams of the carbon fiber, 30 grams of xylene, 30 grams of epoxy resin, and 3 grams of epoxy hardener were cast to form five solid cylinders about 1.5 inches in diameter, and 2.5 inches long. After the epoxy had cured, an axial bore about 8 mm. in diameter was formed in each cylinder, and the cylinders were machined on a lathe to a final cup-like body. The bodies were placed on separate pieces of the carbon felt so that the rim of the cup-like body faced the felt. The bodies and felt pieces were set on a carbon fiber cloth.

An amount of silicon sufficient to saturate the bodies, carbon felt, and carbon cloth, was placed on the carbon cloth. About 3 times the weight of the bodies and cloth, plus 20 times the weight of the felt was a sufficient amount of silicon. The assembly of bodies felt and carbon cloth was heated in the carbon furnace under vacuum to about 1435° C. for 15 minutes to reaction bond silicon with carbon and form silicon carbide bodies. The carbon felt and carbon cloth had also reacted with the silicon to form silicon carbide.

The silicon carbide bodies were cooled to room temperature and found to have excess infiltrant in the form of infiltrant beads or droplets on the inner and outer surfaces of the cup-like bodies. The bodies were removed form the reacted cloth by breaking the reacted felt away from the reacted cloth. The five bodies with reacted felt bonded thereto were placed on another piece of carbon felt, and heated in a vacuum to 1435° C. for 15 minutes. The bodies were cooled to room temperature, and removed from the furnace. The bodies were substantially free of excess infiltrant on the inner and outer surfaces, and separated readily from the reacted felt leaving no visible marks.

What is claimed is:

1. A method of infiltration forming a silicon carbide body having improved surface finish comprising:

infiltrating a porous carbonaceous perform with molten silicon infiltrant to form a silicon carbide body, whereby droplets of silicon form on the body surface, placing the body in contact with an infiltrant wicking means, and heating the body in an inert atmosphere or vacuum to a temperature where the infiltrant is molten, whereby the droplets are substantially removed.

2. A method according to claim 1 wherein the wicking means has infiltrant wicking capillaries at least as large as the infiltrant wicking capillaries in the body.

3. A method according to claim 2 wherein the wicking means is carbon felt.

* * * * *